(12) United States Patent
Lu et al.

(10) Patent No.: US 11,528,793 B1
(45) Date of Patent: Dec. 13, 2022

(54) HIGH-COMPATIBILITY LIGHTING DIMMER

(71) Applicant: Xiamen PVTECH Co., Ltd., Fujian (CN)

(72) Inventors: Fuxing Lu, Fujian (CN); Rongtu Liu, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 0 days.

(21) Appl. No.: 17/491,540

(22) Filed: Oct. 1, 2021

(30) Foreign Application Priority Data

Aug. 9, 2021 (CN) .......................... 202110906936.0

(51) Int. Cl.
  *H05B 47/10* (2020.01)
  *H05B 47/20* (2020.01)
(52) U.S. Cl.
  CPC ............. *H05B 47/10* (2020.01); *H05B 47/20* (2020.01)
(58) Field of Classification Search
  CPC .............................. H05B 47/10; H05B 47/20
  See application file for complete search history.

(56) References Cited

U.S. PATENT DOCUMENTS

| 10,045,407 | B1* | 8/2018 | Theunissen | ............ H05B 47/10 |
| 2012/0043900 | A1* | 2/2012 | Chitta | .................. H05B 41/295 |
| | | | | 315/201 |
| 2014/0265897 | A1* | 9/2014 | Taipale | ............. H02J 13/00004 |
| | | | | 363/126 |

* cited by examiner

*Primary Examiner* — Minh D A
(74) *Attorney, Agent, or Firm* — Winston Hsu

(57) ABSTRACT

A high-compatibility lighting dimmer is provided, which includes an impedance inspection avoidance module, a dimming operation module, an alternating-voltage input module and a dimming control module. The impedance inspection avoidance circuit is connected to a load via an output end. The dimming operation module is connected to the impedance inspection avoidance module and includes a control unit. The alternating-voltage input module is connected to the dimming operation module and converts an input alternating voltage into a pulsating direct voltage to power the load and the dimming operation module. The dimming control module is connected to the control unit and transmits a dimming signal to the control unit. When the load is driven, the control unit starts timing and switches the impedance inspection avoidance module after a predetermined time period, whereby the dimming operation module directly powers the load and performs dimming for the load according to the dimming signal.

14 Claims, 4 Drawing Sheets

HIGH-COMPATIBILITY LIGHTING DIMMER

BACKGROUND OF THE INVENTION

1. Field of the Invention

The present invention relates to a dimmer, in particular to a high-compatibility lighting dimmer.

2. Description of the Prior Art

Currently, the dimming solutions used by currently available lighting devices (e.g., light bulb, light tube, panel light, etc.) include SCR dimming solution, multi-step and stepless dimming solutions (controlled by a wall switch), wired dimming solution (e.g., 0-10 V, 1-10 V, etc.), resistance dimming solution, wireless dimming solution (e.g., Bluetooth, WIFI, etc.). The dimming circuits of the above solutions are integrated in the drivers of lighting devices and all these solutions need the corresponding dimmers to realize the dimming function thereof. There are too many dimming solutions, which not only increases the costs of lighting devices having dimming function, but also limits the commonality and penetration rate thereof.

SUMMARY OF THE INVENTION

The present invention is related to a high-compatibility lighting dimmer. In one embodiment of the present invention, the high-compatibility lighting dimmer includes an impedance inspection avoidance module, a dimming operation module, an alternating-voltage input module and a dimming control module. The impedance inspection avoidance circuit is connected to a load via an output end. The dimming operation module is connected to the impedance inspection avoidance module and includes a control unit. The alternating-voltage input module is connected to the dimming operation module and converts an input alternating voltage into a pulsating direct voltage in order to power the load and the dimming operation module. The dimming control module is connected to the control unit and transmits a dimming signal to the control unit. When the load is driven, the control unit starts timing and switches the impedance inspection avoidance module after a predetermined time period, whereby the dimming operation module directly powers the load and performs dimming for the load according to the dimming signal.

As described above, the high-compatibility lighting dimmer according to the embodiment may include one or more of the following advantages:

(1) In one embodiment of the present invention, the design of the high-compatibility lighting dimmer can take full advantage of the original characteristics of switch power sources, which can reduce the voltage by controlling the current. Thus, the high-compatibility lighting dimmer can be compatible with various direct-current (DC) or alternating-current (AC) lighting devices so as to achieve high commonality.

(2) In one embodiment of the present invention, the high-compatibility lighting dimmer has an impedance inspection avoidance module, which can perform a special operating mechanism in order to provide an AC-grid impedance inspection avoidance function. Accordingly, the high-compatibility lighting dimmer can be compatible with all lighting devices having AC-grid impedance inspection function with a view to further increase the commonality thereof.

(3) In one embodiment of the present invention, the circuit design of the high-compatibility lighting dimmer can make the output current be proportional to the output voltage to achieve a linear relation, so the high-compatibility lighting dimmer can be more comprehensive in application.

(4) In one embodiment of the present invention, the high-compatibility lighting dimmer can control the constant-current switch unit to enter the hiccup mode in order to perform the short-circuit protection function. Therefore, the safety of the high-compatibility lighting dimmer can be further enhanced.

(5) In one embodiment of the present invention, the high-compatibility lighting dimmer has a loading ratio adjustment module, so the user can properly adjust the loading ratio via the loading ratio adjustment module according to the power of the load. Accordingly, the whole stroke of the dimming control module can be used for performing dimming, so the dimming adjustment range can be optimized and the dimming process can be gradual.

(6) In one embodiment of the present invention, the high-compatibility lighting dimmer has an electricity inspection module, which can generate a voltage/current information according to a pulsating direct voltage and transmits the voltage/current information to the control unit, such that the control unit calculates an electricity consumption information according to the voltage/current information. Thus, the user can know the current electricity consumption and the technicians can conveniently manage these devices.

(7) In one embodiment of the present invention, the high-compatibility lighting dimmer has an Internet-of-Thing connection module, which can receive a control instruction from a remote management platform and transmit an operational status information to the remote management platform. In this way, the technicians can more effectively control the dimmers and know the operational status of each of the dimmers in a short time.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
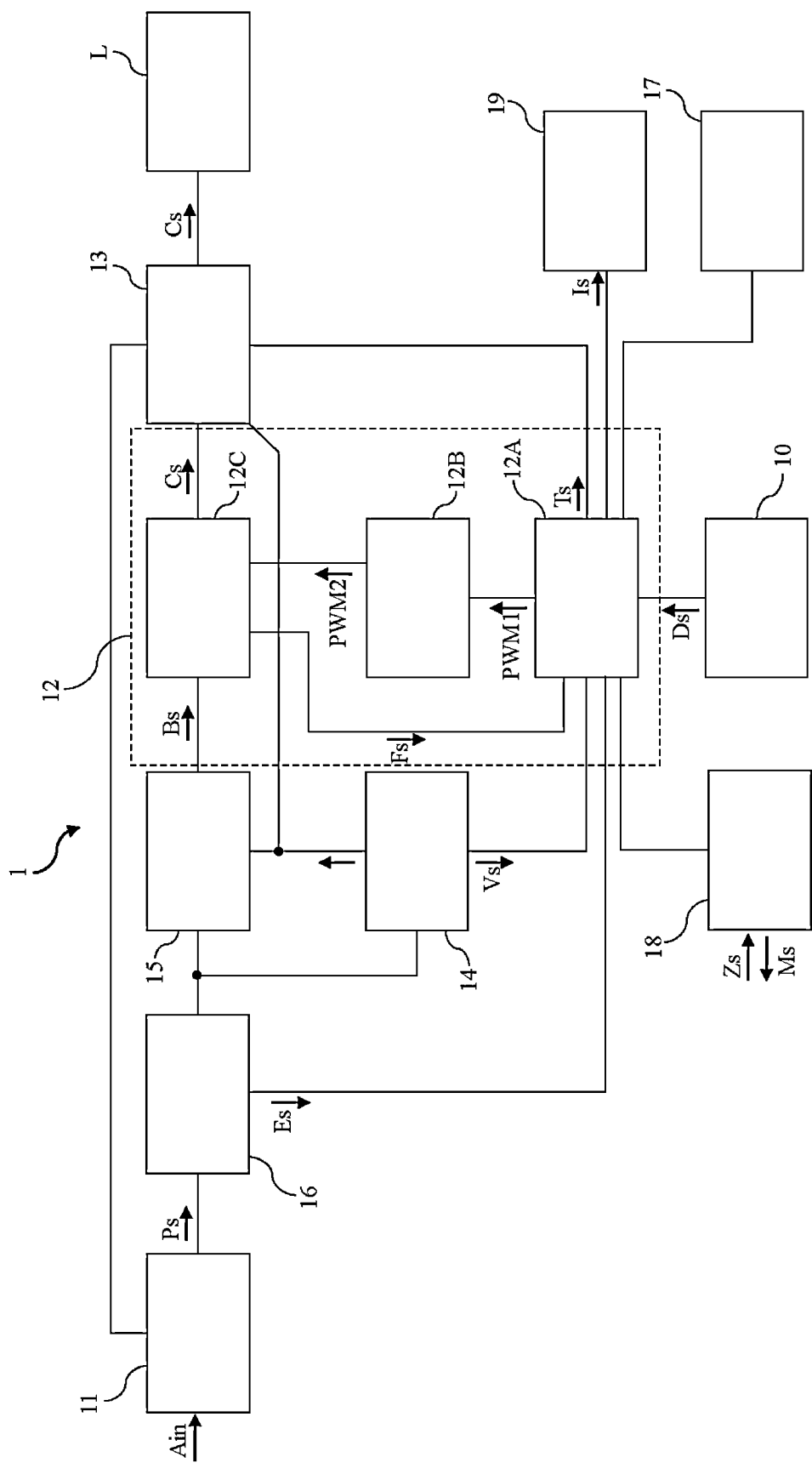
FIG. 1 is a block diagram of a high-compatibility lighting dimmer in accordance with a first embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 2:
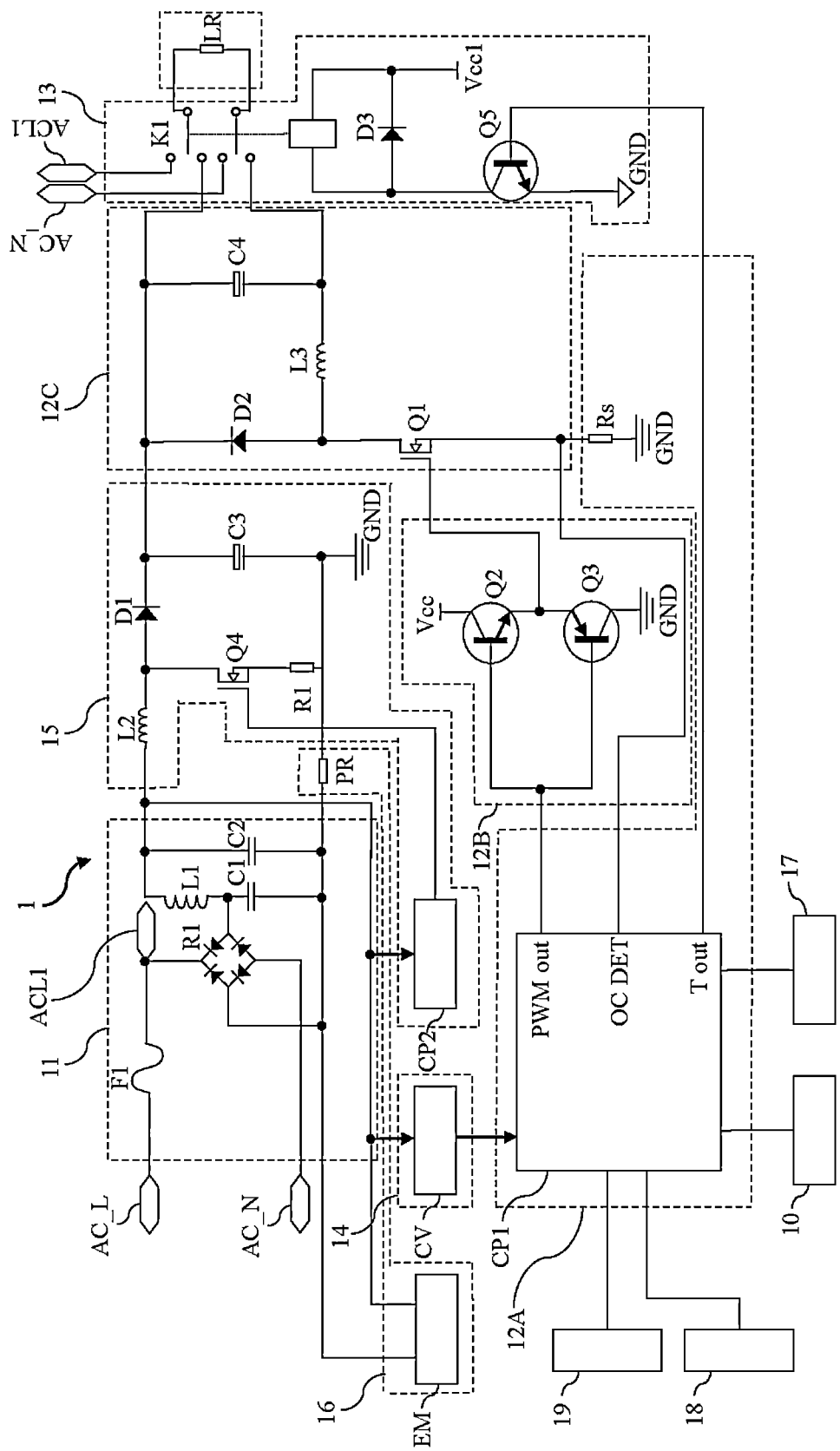
FIG. 2 is a circuit diagram of the high-compatibility lighting dimmer in accordance with the first embodiment of the present invention.

Please refer to FIG. 1 and FIG. 2, which are a block diagram and a circuit diagram of a high-compatibility lighting dimmer in accordance with a first embodiment of the present invention respectively. As shown in FIG. 1, the high-compatibility dimmer circuit 1 includes a dimming control module 10, an alternating-voltage input module 11, a power factor correction (PFC) module 15, a dimming operation module 12, an impedance inspection avoidance module 13, a constant-voltage power supply module 14, an electricity inspection module 16, a loading ratio adjustment module 17, an Internet-of-Thing (IoT) connection module 18 and a display module 19.

The impedance inspection avoidance module 13 is connected to a load LR via an output end. In one embodiment, the load LR and may be a light source having no dimming function, such as a light bulb, a light tube, a panel light, or other light-emitting diode (LED) light sources.

The dimming operation module 12 is connected to the impedance inspection avoidance module 13, and includes a control unit 12A, a pulse width modulation (PWM) signal totem-pole unit 12B and a constant-current switch unit 12C. In one embodiment, the control unit 12A may be a microcontroller unit (MCU) or other control chips.

The alternating-voltage input module 11 serves as a power source. The alternating-voltage input module 11 is connected to the dimming operation module 12 via the electricity inspection module 16 and the PFC module 15. The alternating-voltage input module 11 rectifies and filters an input alternating voltage Ain via a bridge rectifier and a filter capacitor respectively in order to generate a pulsating direct voltage Ps. The pulsating direct voltage Ps is inputted into a constant-voltage power supply module 14 and the constant-voltage power supply module 14 converts the pulsating direction voltage Ps into a constant voltage Vs so as to power the control unit 12A and the impedance inspection avoidance module 13. The PFC module 15 boosts the pulsating direct voltage Ps to generate a boosted direct voltage Bs for powering the load LR. In one embodiment, the PFC module 15 may be, but not limited to, an active PFC circuit.

The dimming control module 10 is connected the control unit 12A, so the user can operate the dimming control module 10 to generate a dimming signal Ds and the dimming signal Ds is transmitted to the control unit 12A in order to performing dimming for the load LR. In one embodiment, the dimming control module 10 may be, but not limited to, a dimming signal regulator, which may include a variable resistor, a capacitive/resistive touch panel and the peripheral circuit thereof.

After the load LR is driven, the control unit 12A starts timing and switches the impedance inspection avoidance module 13 after a predetermined time period, such that the dimming operation module 12 can directly power the load LR. Meanwhile, the dimming operation module 12 can performs dimming for the load LR according to a dimming signal Ds inputted by the dimming control module 10. In one embodiment, the dimming signal Ds may be, but not limited to, a PWM signal (0-10V), a resistance or other dimming signals.

The embodiment just exemplifies the present invention and is not intended to limit the scope of the present invention; any equivalent modification and variation according to the spirit of the present invention is to be also included within the scope of the following claims and their equivalents.

FIG. 2 illustrates one of the preferred circuit designs of the high-compatibility dimmer circuit 1. As shown in FIG. 2, the electricity inspection module 16 may include an electricity meter EM and a resistor PR. The alternating-voltage input module 11 may include a fuse F1, a bridge rectifier R1, capacitors C1~C2 and an inductor L1. The control unit 12A may include a microcontroller unit CP1 and a resistor Rs; the microcontroller unit CP1 can be replaced by other similar components. The PWM signal totem-pole unit 12B may include transistors Q2~Q3; in another embodiment, the PWM signal totem-pole unit 12B may also be a totem-pole chip. The constant-current switch unit 12C may include a transistor Q1, a diode D2, an inductor L3 and a capacitor C4. The impedance inspection avoidance module 13 may include a relay K1, a diode D3 and a transistor Q5. In one embodiment, the relay K1 may be, but not limited to, any one of a mechanical relay, a solid-state relay, an electronic switch and a photoelectric switch. The above is just for illustration, the relay K1 may also be other similar components. The constant-voltage power supply module 14 may include a constant-voltage auxiliary power supply CV. The PFC module 15 may include an application specific integrated circuit (ASIC) chip CP2, an inductor L2, a diode D1, a transistor Q4, a resistor R1 and a capacitor C3. The embodiment is just for illustration, the circuit designs of the modules of the high-compatibility lighting dimmer 1 can be changed according to actual requirements.

In the embodiment, the operational process of the main loop of the high-compatibility lighting dimmer 1 is as follows:

The alternating-voltage input module 11 rectifies and filters the input alternating voltage Ain via the bridge rectifier R1 and the filter capacitor respectively in order to generate the pulsating direct voltage Ps. The PFC module 15 boosts the pulsating direct voltage Ps so as to generate the boosted direct voltage Bs for powering the load LR. Simultaneously, the on-time of the main transistor Q4 of the PFC module 15 varies with the sine wave of the input voltage, such that the conduction angle of the rectifier diode of the alternating-voltage input module 11 can be greater in order to increase the power factor. Meanwhile, the pulsating direct voltage Ps is inputted in to the constant-voltage power supply module 14, and the constant-voltage power supply module 14 converts the pulsating direct voltage Ps into the constant voltage Vs in order to power the control unit 12A and the impedance inspection avoidance module 13.

As set forth above, as the high-compatibility lighting dimmer 1 of the embodiment has the specially-designed impedance inspection avoidance module 13, so the high-compatibility lighting dimmer 1 can be applicable to all currently available lamp tubes having grid impedance inspection function. In the embodiment, the operational process of the grid impedance inspection function of the high-compatibility lighting dimmer 1 is as follows:

The alternating-voltage input module 11 rectifies and filters the input alternating voltage Ain via the bridge rectifier R1 and the filter capacitor respectively in order to generate the pulsating direct voltage Ps. In the meanwhile, the pulsating direct voltage Ps is inputted into the constant-voltage power supply module 14 and the constant-voltage power supply module 14 converts the pulsating direct voltage Ps into the constant voltage Vs in order to power the control unit 12A and the impedance inspection avoidance module 13. When the load LR is driven, the microcontroller unit CP1 of the control unit 12A starts timing. Then, the T out pin of the microcontroller unit CP1 outputs a control signal Ts to switch the relay K1 of the impedance inspection avoidance module 13 after a predetermined time period (0.1-0.5 seconds). Since the grid impedance inspection circuit of the load LR has finished the inspection process after the predetermined time period (0.1-0.5 seconds), the load LR can be powered by the dimming operation module 12.

As described above, the grid impedance inspection circuit of the load LR performs the inspection process for only one time. In other words, the inspection process will not be performed again if the input voltage of the grid impedance inspection circuit does not decrease to be lower than a specific threshold value. Thus, the load LR can keep being in on state. The high-compatibility light dimmer 1 of the embodiment can take full advantage of the above characteristics with a view to effectively evade the grid impedance inspection, so the high-compatibility lighting dimmer 1 can be compatible with all currently available lighting devices having grid impedance inspection function.

In the embodiment, the operational process of the dimming function of the high-compatibility lighting dimmer 1 is as follows:

After the grid impedance inspection circuit of the load LR has finished the inspection process and the load LR is powered by the dimming operation module 12, the PWM out pin of the microcontroller CP1 of the control unit 12A outputs a corresponding PWM signal PWM1 to the PWM signal totem-pole unit 12B according to the dimming signal Ds and a built-in comparison table thereof. Then, the PWM signal totem-pole unit 12B generates an enhanced PWM signal PWM2 according to the PWM signal PWM1. The ability of inputting current into the gate of the transistor (MOS) can be enhanced, such that the transistor can enter the saturation state faster. Besides, the transistor can also exit from the saturation state and then enter the cut-off state in a short time. Afterward, the constant-current switch unit 12C changes the mode of turning on/off the transistor Q1 (the switch) according to the enhanced PWM signal PWM2 in order to adjust the driving current Cs of the load LR and perform dimming.

Since the driving circuits of all lighting devices with or without dimming function adopt semiconductor switches (except linear power sources), and all driving solutions limit the maximal on-time of semiconductor switch elements. Accordingly, when the input voltage is low enough, the on-time, provided by the driving circuit, of the semiconductor switch reaches the maximum; now, the driving circuit is not in active current-limited/constant-current state. In this way, the current control of the load can be realized by properly reducing the input voltage in order to execute the dimming function. The high-compatibility lighting dimmer 1 of the embodiment can take full advantage of the characteristics, so can realize the dimming function for all lighting devices without dimming function by controlling the current and reducing the voltage.

The high-compatibility lighting dimmer 1 of the embodiment further includes the electricity inspection module 16, a loading ratio adjustment module 17, an IoT connection module 17 and a display module 19.

The electricity inspection module 16 is connected to the alternating-voltage input module 11. The display module 19 is connected to the control unit 12A. The electricity inspection module 16 generates a voltage/current information Es according to the pulsating direct voltage Ps and transmits the voltage/current information Es to the control unit 12A. Then, the control unit 12A calculates an electricity consumption information Is according to the voltage/current information Es and the display module 19 displays the electricity consumption information Is. In this way, the user can know the overall electricity consumption. The load LR generates a load current when the load LR normally operates and the load current is directly reflected in the voltage difference between the two ends of the load PR. Therefore, the electricity meter EM calculates the current flowing through the two ends of the resistor PR for now according to the voltage difference between the two ends of the resistor PR. Meanwhile, the electricity meter EM can generate the voltage/current information ES according to the rectified pulsating direct voltage Ps and transmit the voltage/current information ES to the control unit 12A. Then, the control unit 12A calculates the electricity consumption information Is and the current electricity consumption according to the voltage/current information Es. Afterward, the display module 19 displays the electricity consumption information Is. In this way, the user can know the overall electricity consumption and the technicians of the remote management platform can conveniently manage these devices.

The loading ratio adjustment module 17 is connected to the control unit 12A with a view to adjust the loading ratio. A part of the stroke of the manual adjustment knob of the dimming control module 10 may not function because the power of the load LR is less than the rated power or due to other reasons. For instance, if the rated power is 200 W while the actual power of the load LR is only 100 W. In this case, if the stroke of the dimming control module 10 is 0%~100%, only 0%~50% of the stroke of the dimming control module 10 can function and the other part of the stroke thereof cannot change the current passing through the load LR. Accordingly, since the value of the load current and the brightness of the lighting device can be adjusted via only 0%~50% of the stroke of the dimming control module 10, the dimming curve will be short and steep instead of being gradual. For solving the above problem, the user can adjust the loading ratio of the loading ratio adjustment module 17 to the position corresponding to the load LR to change the adjustment range. In this way, the dimming process can become much more gradual.

The IoT connection module 18 is connected to the control unit 12A, which can receive a control instruction Zs from the remote management platform and transmit an operation status information Ms to the remote management platform. The control instruction Zs may be, but not limited to, one or more of dimming value, output value, turning-on instruction, turning-off instruction, scene setting and timing control instruction. The operational status information Ms may be, but not limited to, one or more of dimming range, real-time electricity consumption, total electricity consumption of a certain time period, total operational time of the dimmer and time record of turning on the dimmer last time. Two dimmers 1 having the IoT connection modules 18 can form a network and the address assignment can be executed by the remote management platform. Moreover, the dimmers 1 having the IoT connection modules 18 can transmit information to each other to share information after the bridge connection between these dimmers 1 is established.

The electricity inspection module 16, the loading ratio adjustment module 17, the IoT connection module 18 and the display module 19 can be selectively added to the dimmer 1 or removed from the dimmer 1 according to actual requirements.

Figure 3:
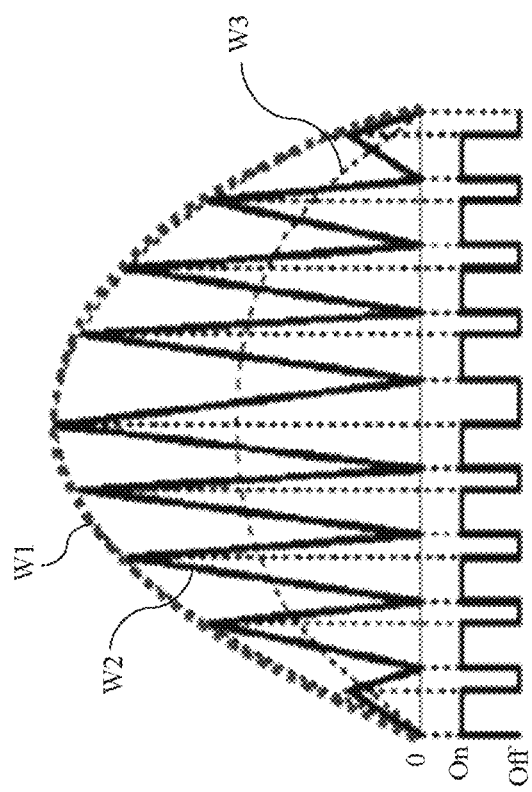
FIG. 3 is a schematic view of a constant-current switch unit of the high-compatibility lighting dimmer in accordance with the first embodiment of the present invention.

Please refer to FIG. 3, which is a schematic view of a constant-current switch unit of the high-compatibility lighting dimmer in accordance with the first embodiment of the present invention. FIG. 3 illustrates the waveforms of the signals of the constant-current switch unit 12C. As shown in FIG. 3, W1 stands for the envelope of the peak current; W2 stands for the inductance current; W3 stands for the average inductance current.

As shown in FIG. 1 and FIG. 2, the high-compatibility lighting dimmer 1 of the embodiment can further provide the short-circuit protection function and the operational process thereof is as follows:

When the output end is short-circuited, the voltage difference Fs between two ends of the resistor Rs connected to the constant-current switch unit 12C in series suddenly increases. The OC DET pin of the microcontroller unit CP1 of the control unit 12A detects the voltage difference Fs between the two ends of the resistor Rs and compares which with the built-in default value of the microcontroller unit CP1. When the microcontroller unit CP1 determines that the voltage difference Fs between the two ends of the resistor Rs exceeds the default value, the microcontroller unit CP1 outputs a low-level signal to the constant-current switch unit 12C in order to control the constant-current switch unit 12C to enter the hiccup mode from the normal mode so as to perform the short-circuit protection function. In the normal state, the OC DET pin of the microcontroller unit CP1 can also serve as the current limiting reference pin. That is to say, the maximum of the output current can be changed by changing the voltage of the OC DET pin.

As set forth above, the design of the high-compatibility lighting dimmer 1 can take full advantage of the original characteristics of switch power sources, which can reduce the voltage by controlling the current. Thus, the high-compatibility lighting dimmer can be compatible with various direct-current (DC) or alternating-current (AC) lighting devices so as to achieve high commonality.

In addition, the high-compatibility lighting dimmer 1 has an impedance inspection avoidance module, which can perform a special operating mechanism in order to provide an AC-grid impedance inspection avoidance function. Accordingly, the high-compatibility lighting dimmer 1 can be compatible with all lighting devices having AC-grid impedance inspection function with a view to further increase the commonality thereof.

The embodiment just exemplifies the present invention and is not intended to limit the scope of the present invention; any equivalent modification and variation according to the spirit of the present invention is to be also included within the scope of the following claims and their equivalents.

Figure 4:
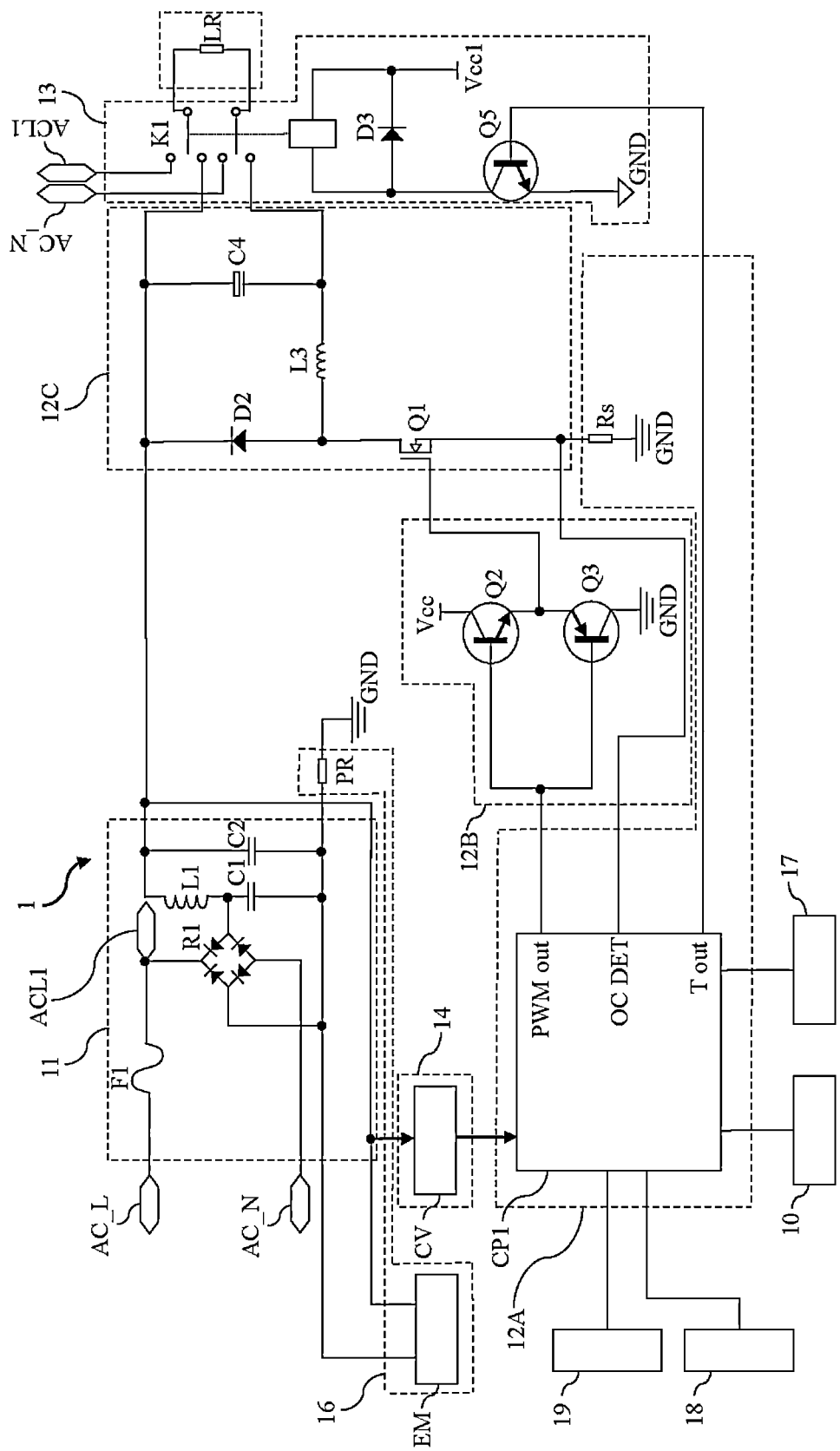
FIG. 4 is a block diagram of a high-compatibility lighting dimmer in accordance with a second embodiment of the present invention.

Please refer to FIG. 4, which is a block diagram of a high-compatibility lighting dimmer in accordance with a second embodiment of the present invention. The difference between this embodiment and the previous embodiment is that the high-compatibility lighting dimmer of this embodiment omits the PFC module 15. The power factor correction function can be realized via the constant-current switch unit 12C. For instance, the power factor can be increased by changing the frequency and the duty cycle of the switching signal of the constant-current switch unit 12C.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the design of the high-compatibility lighting dimmer can take full advantage of the original characteristics of switch power sources, which can reduce the voltage by controlling the current. Thus, the high-compatibility lighting dimmer can be compatible with various DC or AC lighting devices so as to achieve high commonality.

Also, according to one embodiment of the present invention, the high-compatibility lighting dimmer has an impedance inspection avoidance module, which can perform a special operating mechanism in order to provide an AC-grid impedance inspection avoidance function. Accordingly, the high-compatibility lighting dimmer can be compatible with all lighting devices having AC-grid impedance inspection function with a view to further increase the commonality thereof.

In addition, according to one embodiment of the present invention, the circuit design of the high-compatibility lighting dimmer can make the output current be proportional to the output voltage to achieve a linear relation, so the high-compatibility lighting dimmer can be more comprehensive in application.

Besides, according to one embodiment of the present invention, the high-compatibility lighting dimmer can control the constant-current switch unit to enter the hiccup mode in order to perform the short-circuit protection function. Therefore, the safety of the high-compatibility lighting dimmer can be further enhanced.

Further, according to one embodiment of the present invention, the high-compatibility lighting dimmer has a loading ratio adjustment module, so the user can properly adjust the loading ratio via the loading ratio adjustment module according to the power of the load. Accordingly, the whole stroke of the dimming control module can be used for performing dimming, so the dimming adjustment range can be optimized and the dimming process can be gradual.

Moreover, according to one embodiment of the present invention, the high-compatibility lighting dimmer has an electricity inspection module, which can generate a voltage/current information according to a pulsating direct voltage and transmits the voltage/current information to the control unit, such that the control unit calculates an electricity consumption information according to the voltage/current information. Thus, the user can know the current electricity consumption and the technicians can conveniently manage these devices.

Furthermore, according to one embodiment of the present invention, the high-compatibility lighting dimmer has an Internet-of-Thing connection module, which can receive a control instruction from a remote management platform and transmit an operational status information to the remote management platform. In this way, the technicians can more effectively control the dimmers and know the operational status of each of the dimmers in a short time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A high-compatibility lighting dimmer, comprising:
   an impedance inspection avoidance circuit, connected to
      a load via an output end;

a dimming operation module, connected to the impedance inspection avoidance module and comprising a control unit, wherein the dimming operation module and the load are powered by a power source; and a dimming control module, connected to the control unit and configured to transmit a dimming signal to the control unit;

wherein when the load is driven, the control unit is configured to start timing and switch the impedance inspection avoidance module after a predetermined time period, whereby the dimming operation module directly powers the load and performs dimming for the load according to the dimming signal; and wherein the dimming operation module further comprises a pulse width modulation signal totem-pole unit and a constant-current switch unit, wherein the control unit is connected to the pulse width modulation signal totem-pole unit and the constant-current switch unit, the pulse width modulation signal totem-pole unit is connected to the constant-current switch unit, and the constant-current switch unit is connected to the alternating-voltage input module and the impedance inspection avoidance module.

2. The high-compatibility lighting dimmer as claimed in claim 1, wherein the power source is an alternating-voltage input module connected to the dimming operation module and configured to convert an input alternating voltage into a pulsating direct voltage so as to power the load and the dimming operation module.

3. The high-compatibility lighting dimmer as claimed in claim 2, further comprising an electricity inspection module connected to the alternating-voltage input module and the control module, wherein the electricity inspection module is configured to generate a voltage/current information according to the pulsating direct voltage and transmits the pulsating direct voltage to the control unit, whereby the control unit calculates an electricity consumption information according to the voltage/current information.

4. The high-compatibility lighting dimmer as claimed in claim 3, further comprising a display module connected to the control unit, wherein the display module is configured to receive the electricity consumption information and display the electricity consumption information.

5. The high-compatibility lighting dimmer as claimed in claim 2, further comprising a constant-voltage power supply module, wherein the dimming operation module is connected to the alternating-voltage input module via the constant-voltage power supply module, and the constant-voltage power supply module is configured to convert the pulsating direct voltage into a constant voltage so as to power the dimming operation module.

6. The high-compatibility lighting dimmer as claimed in claim 1 wherein when the input end is short-circuited, the control unit is configured to control the constant-current switch unit to enter a hiccup mode in order to perform a short-circuit protection function.

7. The high-compatibility lighting dimmer as claimed in claim 1 wherein the control unit is configured to generate a pulse width modulation signal according to the dimming signal and the pulse width modulation signal totem-pole unit is configured to generate an enhanced pulse width modulation signal according to the pulse width modulation signal, wherein the constant-current switch unit is configured to change a mode of turning on/off switches according to the enhanced pulse width modulation signal in order to adjust a driving current of the load and perform dimming.

8. The high-compatibility lighting dimmer as claimed in claim 1 further comprising a power factor correction module, wherein the constant-current switch unit is connected to the alternating-voltage input module via the power factor correction module, and the power factor correction module is configured to generate a boosted direct voltage according to the pulsating direct voltage in order to power the dimming operation module.

9. The high-compatibility lighting dimmer as claimed in claim 8, wherein the power factor correction module is an active power factor correction module.

10. The high-compatibility lighting dimmer as claimed in claim 1, further comprising a loading ratio adjustment module connected to the control module and configured to adjust a loading ratio.

11. The high-compatibility lighting dimmer as claimed in claim 1, further comprising an internet-of-thing connection module connected to the control module, wherein the internet-of-thing connection module is configured to receive a control instruction from a remote management platform and transmit an operational status information to the remote management platform.

12. The high-compatibility lighting dimmer as claimed in claim 1, wherein the predetermined time period is 0.1-0.5 seconds.

13. The high-compatibility lighting dimmer as claimed in claim 1, wherein the load is a light source without a dimming function.

14. The high-compatibility lighting dimmer as claimed in claim 1, wherein the impedance inspection avoidance module is any one of a mechanical relay, a solid-state relay, an electronic switch and a photoelectric switch.

* * * * *